US009092636B2

(12) United States Patent
More et al.

(10) Patent No.: US 9,092,636 B2
(45) Date of Patent: Jul. 28, 2015

(54) METHODS AND SYSTEMS FOR EXACT DATA MATCH FILTERING

(75) Inventors: Scott More, Tokyo (JP); Ilya Beyer, San Mateo, CA (US)

(73) Assignee: WORKSHARE TECHNOLOGY, INC., San Francisco, CA (US)

( * ) Notice: Subject to any disclaimer, the term of this patent is extended or adjusted under 35 U.S.C. 154(b) by 1081 days.

(21) Appl. No.: 12/621,429

(22) Filed: Nov. 18, 2009

(65) Prior Publication Data

US 2010/0299727 A1 Nov. 25, 2010

Related U.S. Application Data

(60) Provisional application No. 61/115,633, filed on Nov. 18, 2008.

(51) Int. Cl.
*G06F 7/04* (2006.01)
*G06F 15/16* (2006.01)
(Continued)

(52) U.S. Cl.
CPC .............. *G06F 21/62* (2013.01); *G06F 21/554* (2013.01); *G06F 21/6245* (2013.01); *H04L 63/10* (2013.01); *H04L 12/585* (2013.01); *H04L 63/083* (2013.01)

(58) Field of Classification Search
CPC ....... G06F 21/62; G06F 21/554; G06F 21/60; G06F 21/6245; G06F 21/88; G06F 21/6218; G06F 17/30628; G06F 17/3033; H04L 63/10; H04L 12/585; H04L 51/12
USPC ......... 726/2–4, 11–12, 16–17, 21, 26–30; 1/1
See application file for complete search history.

(56) References Cited

U.S. PATENT DOCUMENTS 4,479,195 A   10/1984   Herr et al.
4,949,300 A    8/1990   Christenson et al.
(Continued)

FOREIGN PATENT DOCUMENTS

JP   10177650 A    6/1998
JP   2004265267 A  9/2004
(Continued)

OTHER PUBLICATIONS

PC Magazine "Pure Intranets: Real-Time Internet Collaboration", http://www.zdnet.com/pcmag/featuresgroupware/gpwst.htm, Aug. 30, 2001, 2 pages.
(Continued)

*Primary Examiner* — Shewaye Gelagay
*Assistant Examiner* — Trong Nguyen
(74) *Attorney, Agent, or Firm* — Ted Sabety, Esq.; Sabety + Associates PLLC

(57) ABSTRACT

A technique for efficiently preventing exact data words ("entities") from unauthorized disclosure is disclosed. Protect agents installed at various egress points identify candidate entities from digital information desired to be disclosed by a user. The candidate entities are compared against registered entities stored in a lightweight entity database (LWED). If a candidate entity matches against a registered entity in the LWED, the protect agent initiates a security action. Alternately, the protect agent transmits the matching candidate entity to a global entity database (GED) server to receive additional confirmation on whether the candidate entity matches a registered entity. In some instances, the protect agent also receives (from the GED server) metadata information associated with the matching candidate entity. The protect agent utilizes the metadata information to initiate suitable security actions.

46 Claims, 7 Drawing Sheets

(51) Int. Cl.

| | |
|---|---|
| *G06F 17/30* | (2006.01) |
| *G06F 12/00* | (2006.01) |
| *G06F 12/14* | (2006.01) |
| *G06F 13/00* | (2006.01) |
| *H04L 29/06* | (2006.01) |
| *H04N 7/16* | (2011.01) |
| *G11C 7/00* | (2006.01) |
| *G06F 21/62* | (2013.01) |
| *G06F 21/55* | (2013.01) |
| *H04L 12/58* | (2006.01) |

(56) References Cited

U.S. PATENT DOCUMENTS

| | | |
|---|---|---|
| 5,008,853 A | 4/1991 | Bly et al. |
| 5,072,412 A | 12/1991 | Henderson, Jr. et al. |
| 5,220,657 A | 6/1993 | Bly et al. |
| 5,245,553 A | 9/1993 | Tanenbaum |
| 5,247,615 A | 9/1993 | Mori et al. |
| 5,293,619 A | 3/1994 | Dean |
| 5,379,374 A | 1/1995 | Ishizaki et al. |
| 5,446,842 A | 8/1995 | Schaeffer et al. |
| 5,608,872 A | 3/1997 | Schwartz et al. |
| 5,617,539 A | 4/1997 | Ludwig et al. |
| 5,634,062 A | 5/1997 | Shimizu et al. |
| 5,671,428 A | 9/1997 | Muranaga et al. |
| 5,699,427 A | 12/1997 | Chow et al. |
| RE35,861 E | 7/1998 | Queen |
| 5,787,175 A | 7/1998 | Carter |
| 5,801,702 A | 9/1998 | Dolan et al. |
| 5,806,078 A | 9/1998 | Hug et al. |
| 5,819,300 A | 10/1998 | Kohno et al. |
| 5,832,494 A | 11/1998 | Egger et al. |
| 5,890,177 A | 3/1999 | Moody et al. |
| 5,898,836 A | 4/1999 | Freivald et al. |
| 6,003,060 A | 12/1999 | Aznar et al. |
| 6,012,087 A | 1/2000 | Freivald et al. |
| 6,049,804 A | 4/2000 | Burgess et al. |
| 6,067,551 A | 5/2000 | Brown et al. |
| 6,088,702 A | 7/2000 | Plantz et al. |
| 6,145,084 A | 11/2000 | Zuili et al. |
| 6,189,019 B1 | 2/2001 | Blumer et al. |
| 6,212,534 B1 | 4/2001 | Lo et al. |
| 6,219,818 B1 | 4/2001 | Freivald et al. |
| 6,243,091 B1 | 6/2001 | Berstis |
| 6,263,350 B1 | 7/2001 | Wollrath et al. |
| 6,263,364 B1 | 7/2001 | Najork et al. |
| 6,269,370 B1 | 7/2001 | Kirsch |
| 6,285,999 B1 | 9/2001 | Page |
| 6,301,368 B1 | 10/2001 | Bolle et al. |
| 6,321,265 B1 | 11/2001 | Najork et al. |
| 6,336,123 B2 | 1/2002 | Inoue et al. |
| 6,351,755 B1 | 2/2002 | Najork et al. |
| 6,377,984 B1 | 4/2002 | Najork et al. |
| 6,404,446 B1 | 6/2002 | Bates et al. |
| 6,418,433 B1 | 7/2002 | Chakrabarti et al. |
| 6,418,453 B1 | 7/2002 | Kraft et al. |
| 6,424,966 B1 | 7/2002 | Meyerzon et al. |
| 6,449,624 B1 | 9/2002 | Hammack et al. |
| 6,513,050 B1 | 1/2003 | Williams et al. |
| 6,547,829 B1 | 4/2003 | Meyerzon et al. |
| 6,560,620 B1 | 5/2003 | Ching |
| 6,584,466 B1 | 6/2003 | Serbinis et al. |
| 6,594,662 B1 | 7/2003 | Sieffert et al. |
| 6,596,030 B2 | 7/2003 | Ball et al. |
| 6,614,789 B1 | 9/2003 | Yazdani et al. |
| 6,658,626 B1 | 12/2003 | Aiken |
| 6,738,762 B1 | 5/2004 | Chen et al. |
| 7,035,427 B2 | 4/2006 | Rhoads |
| 7,107,518 B2 | 9/2006 | Ramaley et al. |
| 7,152,019 B2 | 12/2006 | Tarantola et al. |
| 7,212,955 B2 | 5/2007 | Kirshenbaum et al. |
| 7,233,686 B2 | 6/2007 | Hamid |
| 7,240,207 B2 | 7/2007 | Weare |
| 7,299,504 B1 | 11/2007 | Tiller et al. |
| 7,356,704 B2 | 4/2008 | Rinkevich et al. |
| 7,434,164 B2 | 10/2008 | Salesin et al. |
| 7,454,778 B2 * | 11/2008 | Pearson et al. ............... 726/1 |
| 7,496,841 B2 | 2/2009 | Hadfield et al. |
| 7,564,997 B2 | 7/2009 | Hamid |
| 7,624,447 B1 | 11/2009 | Horowitz et al. |
| 7,627,613 B1 | 12/2009 | Dulitz et al. |
| 7,673,324 B2 * | 3/2010 | Tirosh et al. ............... 726/1 |
| 7,680,785 B2 | 3/2010 | Najork |
| 7,694,336 B2 | 4/2010 | Rinkevich et al. |
| 7,720,256 B2 | 5/2010 | Desprez et al. |
| 7,730,175 B1 | 6/2010 | Roesch et al. |
| 7,844,116 B2 | 11/2010 | Monga |
| 7,857,201 B2 | 12/2010 | Silverbrook et al. |
| 7,877,790 B2 | 1/2011 | Vishik et al. |
| 7,890,752 B2 | 2/2011 | Bardsley et al. |
| 8,005,277 B2 | 8/2011 | Tulyakov et al. |
| 8,042,112 B1 | 10/2011 | Zhu et al. |
| 8,181,036 B1 * | 5/2012 | Nachenberg ............... 713/189 |
| 8,286,171 B2 | 10/2012 | More et al. |
| 8,406,456 B2 | 3/2013 | More |
| 8,473,847 B2 | 6/2013 | Glover |
| 8,478,995 B2 | 7/2013 | Alculumbre |
| 8,555,080 B2 | 10/2013 | More et al. |
| 2002/0010682 A1 | 1/2002 | Johnson |
| 2002/0019827 A1 | 2/2002 | Shiman et al. |
| 2002/0023158 A1 | 2/2002 | Polizzi et al. |
| 2002/0052928 A1 | 5/2002 | Stern et al. |
| 2002/0063154 A1 | 5/2002 | Hoyos et al. |
| 2002/0065827 A1 | 5/2002 | Christie et al. |
| 2002/0065848 A1 | 5/2002 | Walker et al. |
| 2002/0073188 A1 | 6/2002 | Rawson |
| 2002/0087515 A1 | 7/2002 | Swannack et al. |
| 2002/0099602 A1 | 7/2002 | Moskowitz et al. |
| 2002/0129062 A1 | 9/2002 | Luparello |
| 2002/0136222 A1 | 9/2002 | Robohm |
| 2002/0138744 A1 | 9/2002 | Schleicher et al. |
| 2002/0159239 A1 | 10/2002 | Amie et al. |
| 2002/0164058 A1 | 11/2002 | Aggarwal et al. |
| 2003/0037010 A1 | 2/2003 | Schelzer |
| 2003/0061260 A1 | 3/2003 | Rajkumar |
| 2003/0131005 A1 | 7/2003 | Berry |
| 2003/0158839 A1 | 8/2003 | Faybishenko et al. |
| 2003/0223624 A1 | 12/2003 | Hamid |
| 2004/0002049 A1 | 1/2004 | Beavers et al. |
| 2005/0138540 A1 | 6/2005 | Baltus et al. |
| 2005/0251748 A1 | 11/2005 | Gusmorino et al. |
| 2006/0005247 A1 * | 1/2006 | Zhang et al. ............... 726/26 |
| 2006/0021031 A1 | 1/2006 | Leahy et al. |
| 2006/0050937 A1 | 3/2006 | Hamid |
| 2006/0059196 A1 | 3/2006 | Sato et al. |
| 2006/0064717 A1 | 3/2006 | Shibata et al. |
| 2006/0067578 A1 | 3/2006 | Fuse |
| 2006/0098850 A1 | 5/2006 | Hamid |
| 2006/0112120 A1 | 5/2006 | Rohall |
| 2006/0171588 A1 | 8/2006 | Chellapilla et al. |
| 2006/0218004 A1 | 9/2006 | Dworkin et al. |
| 2006/0224589 A1 * | 10/2006 | Rowney et al. ............... 707/9 |
| 2006/0236246 A1 | 10/2006 | Bono et al. |
| 2006/0261112 A1 | 11/2006 | Gates et al. |
| 2006/0271947 A1 | 11/2006 | Lienhart et al. |
| 2006/0294468 A1 | 12/2006 | Sareen et al. |
| 2006/0294469 A1 | 12/2006 | Sareen et al. |
| 2007/0005589 A1 | 1/2007 | Gollapudi |
| 2007/0025265 A1 | 2/2007 | Porras et al. |
| 2007/0101154 A1 | 5/2007 | Bardsley et al. |
| 2007/0101413 A1 | 5/2007 | Vishik et al. |
| 2007/0192728 A1 | 8/2007 | Finley et al. |
| 2007/0253608 A1 | 11/2007 | Tulyakov et al. |
| 2007/0261112 A1 * | 11/2007 | Todd et al. ............... 726/11 |
| 2007/0294318 A1 | 12/2007 | Arora et al. |
| 2007/0294612 A1 | 12/2007 | Drucker et al. |
| 2008/0033913 A1 * | 2/2008 | Winburn ............... 707/3 |
| 2008/0080515 A1 | 4/2008 | Tombroff et al. |
| 2008/0082529 A1 | 4/2008 | Mantena et al. |
| 2008/0219495 A1 | 9/2008 | Hulten et al. |
| 2008/0235760 A1 | 9/2008 | Broussard et al. |
| 2008/0320316 A1 * | 12/2008 | Waldspurger et al. ....... 713/189 |

(56) References Cited

U.S. PATENT DOCUMENTS

| | | |
|---|---|---|
| 2009/0034804 A1 | 2/2009 | Cho et al. |
| 2009/0064326 A1 | 3/2009 | Goldstein |
| 2009/0129002 A1 | 5/2009 | Wu et al. |
| 2009/0241187 A1 | 9/2009 | Troyansky |
| 2010/0017850 A1 | 1/2010 | More et al. |
| 2010/0064372 A1 | 3/2010 | More et al. |
| 2010/0070448 A1 | 3/2010 | Omoigui |
| 2010/0114985 A1 | 5/2010 | Chaudhary et al. |
| 2010/0114991 A1 | 5/2010 | Chaudhary et al. |
| 2010/0257352 A1 | 10/2010 | Errico |
| 2010/0287246 A1 | 11/2010 | Klos et al. |
| 2010/0299727 A1 | 11/2010 | More et al. |
| 2013/0074195 A1 | 3/2013 | Johnston et al. |
| 2013/0097421 A1 | 4/2013 | Lim |

FOREIGN PATENT DOCUMENTS

| | | | |
|---|---|---|---|
| JP | 2007299364 A | | 11/2007 |
| KR | 1020010078840 | | 8/2001 |
| KR | 20040047413 A | | 6/2004 |
| KR | 1020060048686 | | 5/2006 |
| KR | 200070049518 A | | 5/2007 |
| KR | 102008002960 | | 4/2008 |
| WO | WO-0060504 A1 | | 10/2000 |

OTHER PUBLICATIONS

Wells et al., "Groupware & Collaboration Support", www.objs.com/survey/groupwar.htm, Aug. 30, 2001, 10 pages.

Tsai, et al., "A Document Workspace for Collaboration and Annotation based on XML Technology", IEEE, 2000, pp. 165-172.

Roussev, et al., "Integrating XML and Object-based Programming for Distributed Collaboration", IEEE, 2000, pp. 254-259.

XP-002257904, "Workshare Debuts Synergy", 2003, 3 pages.

Microsoft, "Microsoft XP, Product Guide", pp. 1-26.

International Search Report of PCT Application No. PCT/IB2002/005821, Jan. 30, 2004, 6 pages.

International Search Report of PCT Application No. PCT/US2009/051313, Mar. 3, 2010, 3 pages.

Written Opinion of PCT Application No. PCT/US2009/051313, Mar. 3, 2010, 4 pages.

Co-pending U.S. Appl. No. 10/136,733, filed Apr. 30, 2002.

Co-pending U.S. Appl. No. 10/023,010, filed Dec. 17, 2001.

Non-Final Office Action Mailed Mar. 20, 2006 in Co-pending U.S. Appl. No. 10/136,733, filed Apr. 30, 2002.

Notice of Allowance Mailed Oct. 24, 2008 in Co-pending U.S. Appl. No. 10/023,010, filed Dec. 17, 2001.

Non-Final Office Action Mailed May 7, 2008 in Co-pending U.S. Appl. No. 10/023,010, filed Dec. 17, 2001.

Weiss et al., Lightweight document matching for help-desk applications, In: Intelligent Systems and their Applications, IEEE, Vo. 15, Issue:2, pp. 57-61, ISSN 1094-7167, 2000.

International Search Report of PCT Application No. PCT/US2009/065019 dated Jun. 4, 2010, pp. 1-6.

Written Opinion PCT Application No. PCT/US2009/065019 dated Jun. 4, 2010, pp. 1-5.

International Search Report of PCT Application No. PCT/US2009/064919 dated Jul. 1, 2010, pp. 1-3.

Written Opinion PCT Application No. PCT/US2009/064919 dated Jul. 1, 2010, pp. 1-4.

International Search Report of PCT Application No. PCT/US2009/056651, Dated Apr. 21, 2010, pp. 1-3.

Written Opinion PCT Application No. PCt/US2009/056651, Dated Apr. 21, 2010, pp. 1-5.

International Search Report of PCT Application No. PCT/US2009/056668 dated Apr. 16, 2010, pp. 1-9.

Written Opinion PCT Application No. PCT/US2009/056668 dated Apr. 16, 2010 pp. 1-4.

Final Office Action Mailed Apr. 17, 2007 for U.S. Appl. No. 10/023,010, filed Dec. 7, 2001, Issued Patent Number 7,496,841.

Final Office Action Mailed Aug. 12, 2011 for U.S. Appl. No. 12/209,096, filed Sep. 11, 2008.

International Search Report of PCT Application No. PCT/US2010/043345, Apr. 28, 2011, 3 pages.

Non-Final Office Action Mailed Dec. 22, 2011 in Co-Pending U.S. Appl. No. 12/209,082.

Non-Final Office Action Mailed Jan. 9, 2012 in Co-Pending U.S. Appl. No. 12/177,043, filed Jul. 21, 2008.

Non-Final Office Action Mailed Mar. 11, 2011, in Co-pending U.S. Appl. No. 12/209,096, filed Sep. 11, 2008.

Non-Final Office Action Mailed Mar. 16, 2006 for U.S. Appl. No. 10/023,010, filed Dec. 17, 2001, Issued Patent No. 7,496,841.

Non-Final Office Action Mailed Sep. 19, 2011 for U.S. Appl. No. 12/177,043, filed Jul. 21, 2008.

Restriction Requirement Mailed Feb. 14, 2005 for U.S. Appl. No. 10/023,010, filed Dec. 17, 2001, Issued Patent No. 7,496,841.

Restriction Requirement Mailed Feb. 5, 2008 for U.S. Appl. No. 10/023,010, filed Dec. 17, 2001, Issued Patent No. 7,496,841.

Restriction Requirement Mailed Jun. 30, 2006 for U.S. Appl. No. 10/136,733, filed Apr. 30, 2002.

Monga, et al., "Perceptual Image Hashing Via Feature Points: Performance Evaluation and Tradeoffs," IEEE Transactions on Image Processing, vol. 15, No. 11, Nov. 2006.

Monga, "Robust Perceptual Image Hashing using Feature Points," http://bluecoat-02/?cfru=aHR0cDovL3NpZ25hbC51Y2Uud XRleGFz LmVkdS9+dmlzaGGFsL2hhc2gtcGFydEkucHM=, 2003.

Tuklakov, et al., "Symmetric Hash Functions for Fingerprint Minutiae," International Workshop on Pattern Recognition for Crime Prevention, Security and Surveillance, Bath U.K., Oct. 2, 2005, pp. 30-38.

Xuefeng Liang; et al., "Fingerprint Matching Using Minutia Polygons," Pattern Recognition, 2006, ICPR 2006, 18th International Confernce on, vol. 1, No., pp. 1046-1049.

Sujoy Roy, et al., "Robust Hash for Detecting and Localizing Image Tampering," Image Processing, 2007, ICIP 2007, IEEE International Conference on, vol. 6, No., pp. V1-117-V1-120, Sep. 16, 2007-Oct. 19,2007.

Yung, et al., "Generating Robust Digital Signature for Image/Video Authentication," Multimedia and Security Workshop at ACM Multimedia '98, Bristol, U.K., Sep. 1998.

Final Office Action Mailed Apr. 16, 2012 in Co-Pending U.S. Appl. No. 12/177,043, filed Jul. 21, 2008.

Notice of Allowance Mailed Aug. 19, 2012 in Co-Pending U.S. Appl. No. 12/177,043, filed Jul. 21, 2008.

Final Office Action Mailed May 10, 2012 in Co-Pending U.S. Appl. No. 12/209,082, filed Sep. 11, 2008.

Non-Final Office Action Apr. 27, 2012 in Co-Pending U.S. Appl. No. 12/275,185, filed Nov. 20, 2008.

Notice of Allowance Mailed Jun. 26, 2012, in Co-Pending U.S. Appl. No. 12/275,185, filed Nov. 20, 2008.

Co-pending U.S. Appl. No. 13/620,364, filed Sep. 14, 2012.

Co-Pending U.S. Appl. No. 13/659,793, filed Oct. 24, 2012.

Co-Pending U.S. Appl. No. 13/659,817, filed Oct. 24, 2012.

Co-pending U.S. Appl. No. 12/177,043, filed Jul. 21, 2008.

Co-pending U.S. Appl. No. 12/209,082, filed Sep. 11, 2008.

Co-pending U.S. Appl. No. 12/275,185, filed Nov. 20, 2008.

Co-pending U.S. Appl. No. 12/209,096, filed Sep. 11, 2008.

Co-pending U.S. Appl. No. 12/844,818, filed Jul. 27, 2010.

Notice of Allowance Mailed Jun. 26, 2012 in Co-Pending U.S. Appl. No. 12/275,185 of More, S., filed Nov. 20, 2008.

Non-Final Office Action Mailed Apr. 27, 2012 in Co-Pending U.S. Appl. No. 12/275,185, filed Nov. 20, 2008.

Written Opinion PCT Application No. PCT/US2010/043345 dated Apr. 28, 2011, 4 pages.

Final Office Action Mailed Oct. 21, 2013, in Co-Pending U.S. Appl. No. 13/659,793 by More, S., filed Oct. 24, 2012.

Advisory Action Mailed Nov. 1, 2013, in Co-Pending U.S. Appl. No. 13/659,793 by More, S., filed Oct. 24, 2012.

Notice of Allowance Mailed Jul. 8, 2013 in Co-Pending U.S. Appl. No. 12/209,082 by S. More et al. filed Sep. 11, 2008.

Final Office Action Mailed Jan. 18, 2013 in Co-Pending U.S. Appl. No. 12/844,818 by Glover, R., filed Jul. 27, 2010.

(56) References Cited

OTHER PUBLICATIONS

Notice of Allowance Mailed Mar. 13, 2013 in Co-Pending U.S. Appl. No. 12/844,818 by Glover, R., filed Jul. 27, 2010.
Non-Final Office Action Mailed Sep. 19, 2012 in Co-Pending U.S. Appl. No. 12/844,818 by Glover, R., filed Jul. 27, 2010.
Notice of Allowance Mailed Oct. 2, 2012, in Co-Pending U.S. Appl. No. 12/275,185 by More, S., filed Nov. 20, 2008.
Non-Final Office Action Mailed Mar. 18, 2013 in Co-Pending U.S. Appl. No. 13/659,793 by More, S., filed Oct. 24, 2012.
Non-Final Office Action Mailed Apr. 26, 2013 in Co-Pending U.S. Appl. No. 13/659,817 by More, S., filed Oct. 24, 2012.
Notice of Allowance Mailed Sep. 25, 2013, in Co-Pending U.S. Appl. No. 13/659,817 by More, S., filed Oct. 24, 2012.
U.S. Appl. No. 13/789,104, filed Mar. 7, 2013, Gofman.

* cited by examiner

METHODS AND SYSTEMS FOR EXACT DATA MATCH FILTERING

RELATED APPLICATIONS

This application claims priority to U.S. Provisional Application No. 61/115,633, entitled, "METHODS AND SYSTEMS FOR EXACT DATA MATCH FILTERING," filed Nov. 18, 2008. This application is related to U.S. application Ser. No. 12/177,043, entitled "METHODS AND SYSTEMS TO FINGERPRINT TEXTUAL INFORMATION USING WORD RUNS," filed Jul. 21, 2008, and to U.S. application Ser. No. 12/209,082, entitled "METHODS AND SYSTEMS FOR PROTECT AGENTS USING DISTRIBUTED LIGHT-WEIGHT FINGERPRINTS," filed Sep. 11, 2008, both of which are incorporated by reference as if fully set forth herein.

FIELD OF THE INVENTION

The present invention relates to information security and more specifically relates to systems and methods for detecting and preventing unauthorized disclosure of secure information. Furthermore, the present invention pertains to methods and systems for exact data match filtering for structured data.

BACKGROUND

With the rapid increase and advances in digital documentation services and document management systems, organizations are increasingly storing important, confidential, and secure information in the form of digital documents. Unauthorized dissemination of this information, either by accident or by wanton means, presents serious security risks to these organizations. Therefore, it is imperative for the organizations to protect such secure information and detect and react to any secure information from being disclosed beyond the perimeters of the organization.

Additionally, the organizations face the challenge of categorizing and maintaining the large corpus of digital information across potentially thousands of data stores, content management systems, end-user desktops, etc. It is therefore important to the organization to be able to store concise and lightweight versions of fingerprints corresponding to the vast amounts of image data. Furthermore, the organizations face the challenge of categorizing and maintaining the large corpus of digital information across potentially thousands of data stores, content management systems, end-user desktops, etc. One solution to this challenge is to generate fingerprints from all of the digital information that the organization seeks to protect. These fingerprints tersely and securely represent the organization's secure data, and can be maintained in a database for later verification against the information that a user desires to disclose. When the user wishes to disclose any information outside of the organization, fingerprints are generated for the user's information, and these fingerprints are compared against the fingerprints stored in the fingerprint database. If the fingerprints of the user's information matches with fingerprints contained in the fingerprint server, suitable security actions are performed.

However, the user has at his disposal myriad options to disclose the information outside of the organization's protected environment. For example, the user could copy the digital information from his computer to a removable storage medium (e.g., a floppy drive, a USB storage device, etc.), or the user could email the information from his computer through the organization's email server, or the user could print out the information by sending a print request through the organization's print server, etc.

Additionally, in many organizations, sensitive data is stored in databases, including account numbers, patient IDs, and other well-formed, or "structured", data. The amount of this structured data can be enormous and ease of unwanted distribution across the egress points creates security problems for organizations.

The exact data match problem can be thought of as a massive, multi-keyword search problem. Methods for exact keyword match include Wu-Manber and Aho-Corasick. However, these methods are disadvantageous because they do not scale beyond several thousand keywords in space or time.

Full blown databases can be employed for exact data matches, but they do not scale down to Agents residing on Laptops. There are also security concerns with duplicating all the confidential cell data within an organization directly.

A more general approach can be taken where the pattern of each category of structured data is inferred and searched via regular expressions or a more complex entity extraction technique. However, without the actual values being protected, this approach would lead to many false positives.

SUMMARY

Introduced here and described below in detail are methods and systems for exact data match filtering. In one embodiment, an organization's digital information is scanned to retrieve "sensitive" candidate entities. These sensitive entities correspond to structured data words (e.g., social security numbers, patient IDs, etc.) that the organization desires to protect from unauthorized disclosure. In some instances, the candidate entities are identified on the basis of word-patterns and/or heuristic rules. The identified candidate entities are optionally converted to a canonical format to enable the data match inspection engine to be impervious to changes in character encoding, digital format, etc. The candidate entities are then stored as registered entities in an entity database. In some instances, the entity database is a lightweight entity database (LWED) that supports a compressed version of the registered entities. The database compression can be achieved by storing the candidate entities in a data structure that supports membership query while introducing a small error of false positives in the membership query (e.g., a Bloom filter). In some instances, the entity database is a global entity database (GED) that is stored in association with a remote server. The GED includes an uncompressed version of the registered entities (or corresponding hash-values of the entities), and also includes metadata information associated with each of the registered entities.

Protect agents are installed across several egress points (laptop, mail server, etc.) to monitor information being disclosed by a user. The protect agents receive digital information (e.g., textual information) that a user wishes to disclose using the egress point, and identifies candidate entities from the textual information. In one embodiment, the protect agent looks up the candidate entities against registered entities stored in the LWED. If the protect agent detects any matching candidate entities, the protect agent initiates an appropriate security action. In some embodiments, the protect agent communicates with a remote GED server (containing the GED). In such embodiments, the protect agent transmits the matching candidate entities to the GED server, where the candidate entities are again matched against the registered entities in the GED. The results of the GED comparison eliminate or reduce any false positives that may have resulted from the comparison of the candidate entities against the LWED. In some instances, the GED also supplies the protect agent with metadata associated with the matching candidate entities. The metadata information is useful in initiating various types of security actions.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

The present invention may be embodied in several forms and manners. The description provided below and the drawings show exemplary embodiments of the invention. Those of skill in the art will appreciate that the invention may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Figure 1A:
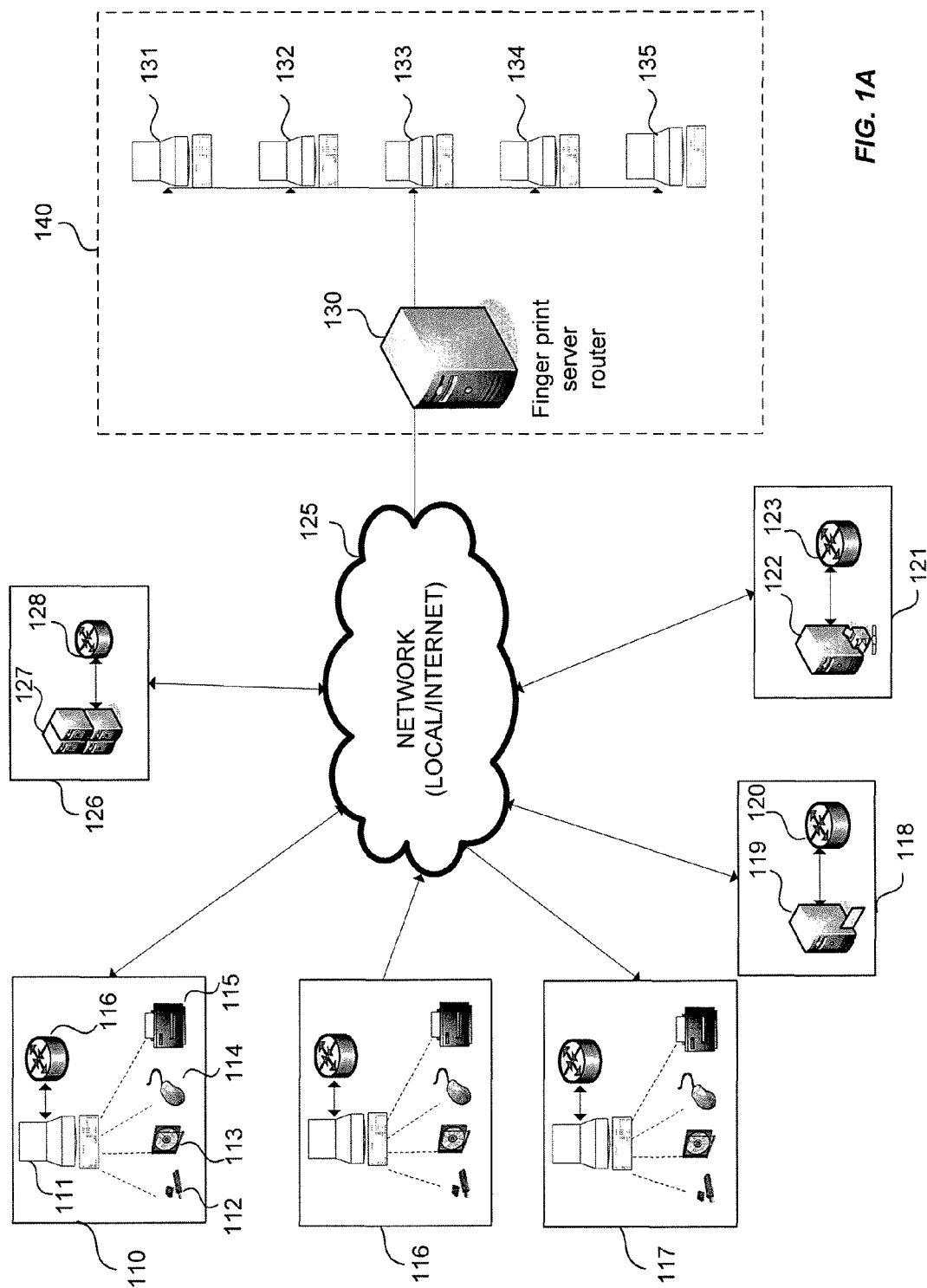
FIG. 1A illustrates an example of an overall setup to implement protect agents for exact data match filtering.

FIG. 1A illustrates an example of an overall setup to implement protect agents for exact data match filtering. One of the means by which a user can disclose digital information outside of the organization's perimeter is by disclosing the information through his computer system 110. Examples of such a computer system include a desktop computer, a laptop, a PDA or any such device that allows a user to access the organization's information. In one embodiment, the computing system 110 is connected to a network 125. Here, the computing system 110 comprises the desktop/laptop computer 111 through which the user accesses the organization's secure information. The user would be able to transfer information outside of the organization by transferring the information to any medium connected to the computer.

Such points (i.e., computer hardware) through which information can be transferred outside of the organization's protected environment are called egress points. Examples of transferring data at egress points include copying the information from the computer to a CD disk 112 or any other optical storage medium, copying the information to a floppy drive 113 or any other tape medium, copying the information to a USB key 114 or other flash based storage medium, transferring the information by printing the information using a printer 115, copying information to the clipboard 115a of the local operating system, etc. In such an event, all the information that is transmitted through the computer 111 needs to be monitored to ensure that secure or sensitive information does not get transferred.

The information to be monitored may include digital textual data, image data, multimedia data etc. Such digital information can be monitored by using, for example, fingerprinting technology to be enable registration and inspection of a large corpus of data. Examples of such fingerprinting technology are described in detail in related applications U.S. application Ser. No. 12/177,043, entitled "METHODS AND SYSTEMS TO FINGERPRINT TEXTUAL INFORMATION USING WORD RUNS," filed Jul. 21, 2008, and U.S. application Ser. No. 12/209,082, entitled "METHODS AND SYSTEMS FOR PROTECT AGENTS USING DISTRIBUTED LIGHTWEIGHT FINGERPRINTS," filed Sep. 11, 2008, both of which are incorporated by reference in their entireties herein. The fingerprinting technology described in the above applications uses various techniques to protect the large corpus an organization's confidential information. In one example, the fingerprinting technology detects sentences, or even paragraphs, in original or derivative forms, and prevents such textual information from being disclosed. However, such fingerprinting technology may not be an effective tool for protection of "exact data words." An "exact data word," as described herein, refers to any combination of characters (e.g., alphabets, numbers, symbols, etc.) that form a structured word. Such exact data words may exist, for example, in the form of patient IDs in a hospital database, social-security numbers, or employees' date-of-birth information, phone numbers, etc. In some instances, such exact data words have a well-structured format or pattern (e.g., social security numbers have a pattern that includes seven numerical characters and two "-" symbols separating groups of the numerical characters). These exact data words may be spread across various documents that constitute the organization's digital information (e.g., in textual data, embedded in images, etc.). When such exact data words are confidential they need to be protected from unauthorized disclosure. To achieve this, the following sections describe techniques for identifying such exact data words, and preventing the exact data words from unauthorized disclosure through any of the egress points.

Returning to FIG. 1A, the various egress points of the computer 111 are monitored to detect any activity that purports to disclose information through the egress points. A software agent, called the protect agent 116, is run on the computer 111 to monitor activity at the egress points (112, 113, 114, 115, 115a) associated with the computer 111. If the organization supports more than one computer system, each of these computer systems (110, 116, 117, 118) have protect agents installed on them to ensure that the activity on each of the computer systems is monitored. In one embodiment, the protect agent 116 is a set of computer instructions or a computer implemented program available on a memory location (e.g., on a magnetic tape drive, a flash memory drive, etc.) at the site of the protect agent 116. In some instances, the protect agent can be implemented by using programmable circuitry programmed by software and/or firmware, or by using special-purpose hardwired circuitry, or by using a combination of such embodiments.

In addition to being installed in every computer system (110, 116, 117, 118) in the network, the protect agents are also installed on other vulnerable egress points across the organization. One example of such a vulnerable egress point includes one or more email server systems 118 connected to the network. The email server 119 handles and routes the emails sent out and received by the organization. The protect agent 120 installed on the email server 119 monitors the emails desired to be sent out of the organization through the email server. Another example of a vulnerable egress point could be a print server 121 connected to the organization's network. A protect agent 123 connected to the print server 122 monitors print jobs sent by the users to the printers connected to the network.

Additional examples of vulnerable egress points include network appliance systems 126. Here, a protect agent 128 is installed in each network appliance 127 to ensure that information disclosed through a particular network appliance 127 is monitored. Examples of using network appliances 126 to transfer data include sharing of data over a network share medium, data transferred at the socket or TCP layer of the network, etc. It is understood that in addition to these examples, the egress points also include other porous environments through which information can be disclosed by the user beyond the secure environment of the organization.

In one embodiment, a lightweight entity database (LWED) 118 is provided locally at the site at which each of the protect agents is installed (e.g., the user's desktop/laptop computer, one of the network appliances, etc.). As will be explained in detail below, in one embodiment, the LWED is a compressed database that includes registered entities. An entity, as described herein, refers to an exact data word. A registration process scans the organization's digital information to extract entities (i.e., exact data words that need to be protected against unauthorized disclosure) and registers them in a database. The entities registered into such a database are referred to as "registered entities." As will be described in detail below, the database may be a global database (GED), or an LWED (which is, for example, a compressed version of the GED).

In one embodiment, at least one redundant copy of the LWED is stored locally at the site of each protect agent 116 such that the protect agent can access or communicate with the LWED even when the protect agent is not connected to any network. For example, a protect agent 116 implemented on a user's laptop computer monitors the activity at all egress points of the user's laptop computer (e.g., 112, 113, 114, etc.) and prevents unauthorized disclosure of information from the laptop computer through the egress points, even if the laptop computer is not connected to any network (e.g., the organization's local network, the public Internet, etc.).

In one illustrative embodiment, the computer systems and all other systems representing egress points (the egress point systems) are centrally connected to a network 125. In one embodiment, the network includes a local network. This includes a network that is managed and maintained locally by the organization. In another embodiment, the network could also be the internet. In the case of the Internet, each of the egress point systems could be directly and individually connected to the internet, or could be connected to a local network or a cluster of local networks, with each of the local networks communicating with each other through the internet. Other combinations of the egress point systems within the local network and the internet are possible and such combinations will be apparent to a person of skill in the art.

In one embodiment where the egress point systems are connected to the network, one or more entity servers (e.g., 131, 132, 133, 134, 135) are connected to the network. The entity server (e.g., 131) is coupled to the GED (that holds the uncompressed version of the registered entities). In one example, each of the entity servers (131, 132, 133, 134, 135) is connected directly to the network. In another example, each of the entity servers (131, 132, 133, 134, 135) is connected to a entity server router 130.

The functions of the entity server router 130 may include, for example, routing requests from a protect agent 116 to the least busy entity server, collecting performance statistics of the entity servers (131, 132, 133, 134, 135) to determine the load on each entity server (such that a request from a protect agent can be routed to the least busy entity server, synchronization and version control of the GED at each entity server, etc.).

In one embodiment, the entity servers (131, 132, 133, 134, 135) could be located at different geographical locations (not shown in FIG. 1A) and connect to the entity server router 130 through the network. This distributed model would allow organizations to run protect agents with minimal performance lag across geographically diverse locations, such that information from the protect agents are routed to the most optimal entity server. It should be noted that the entity server router is not imperative to maintaining a distributed entity server array. Any other means known in the art through which a distributed network can be achieved can be employed in the place of the entity server router 130.

In the case of the public internet, the entity servers (e.g., 131) function as hosted entity servers. A hosted entity server is publicly accessible over the internet. One advantage of using a hosted entity server is that an organization does not have to deploy and manage one or more server appliances within its networks (for the purpose of holding a GED). Some small organizations may not even have infrastructure to maintain a network and host an entity server, but may still require their secure information to be protected. In such cases, the support and manageability of the entity server can be done by even a third party provider that provides the service of a hosted entity server.

A provider offering a hosted registered entity service can also support multi-tenancy services, whereby the provider shares the hosted entity server's resources across different organizations. In one embodiment, this would allow GEDs for multiple organizations to reside on the same server.

It is emphasized that the network 125 and entity servers 140 depicted in FIG. 1A are for illustrative purposes only, and that a network 125 or a entity server setup 140 is not essential for a protect agent 116 to perform an entity lookup. For example, the protect agent 116 may purely rely on the LWED 118 to perform the entity lookup.

Figure 1B:
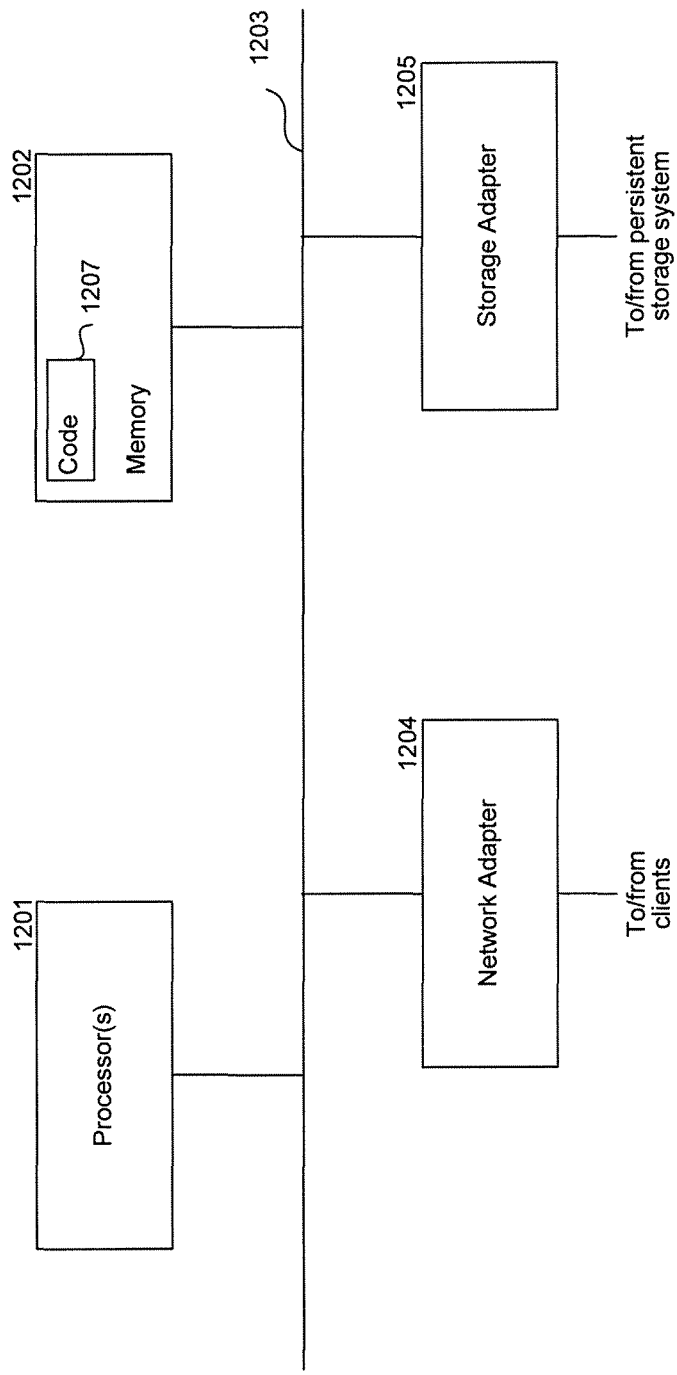
FIG. 1B is a high-level block diagram showing an example of the architecture of an egress point or an entity server.

Now refer to FIG. 1B, which is a high-level block diagram showing an example of the architecture of an egress point (e.g., 111) or an entity server (e.g., 131). The egress ping (e.g., 111) or the entity server (e.g., 131) includes one or more processors 1201 and memory 1202 coupled to an interconnect 1203. The interconnect 1203 shown in FIG. 1B is an abstraction that represents any one or more separate physical buses, point to point connections, or both, connected by appropriate bridges, adapters, or controllers. The interconnect 1203, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 1201 is/are the central processing unit (CPU) of egress point (e.g., 111) or the entity server (e.g., 131) and, thus, control the overall operation of the egress point (e.g., 111) or the entity server (e.g., 131). In certain embodiments, the processor(s) 1201 accomplish this by executing software or firmware stored in memory 1202. The processor(s) 1201 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 1202 is or includes the main memory of the egress point (e.g., 111) or the entity server (e.g., 131). The memory 1202 represents any form of random access memory (RAM), read-only memory (ROM), flash memory, or the like, or a combination of such devices. In use, the memory 1202 may contain, among other things, code 1207 embodying the protect agent 116.

Also connected to the processor(s) 1201 through the interconnect 1203 are a network adapter 1204 and a storage adapter 1205. The network adapter 1204 provides the egress point (e.g., 111) or the entity server (e.g., 131) with the ability to communicate with remote devices over the interconnect 1203 and may be, for example, an Ethernet adapter or Fiber Channel adapter.

Detailed information on how the protect agents at each egress point secure the entities from unauthorized disclosure is provided with reference to FIGS. 2-5 below.

Figure 2:
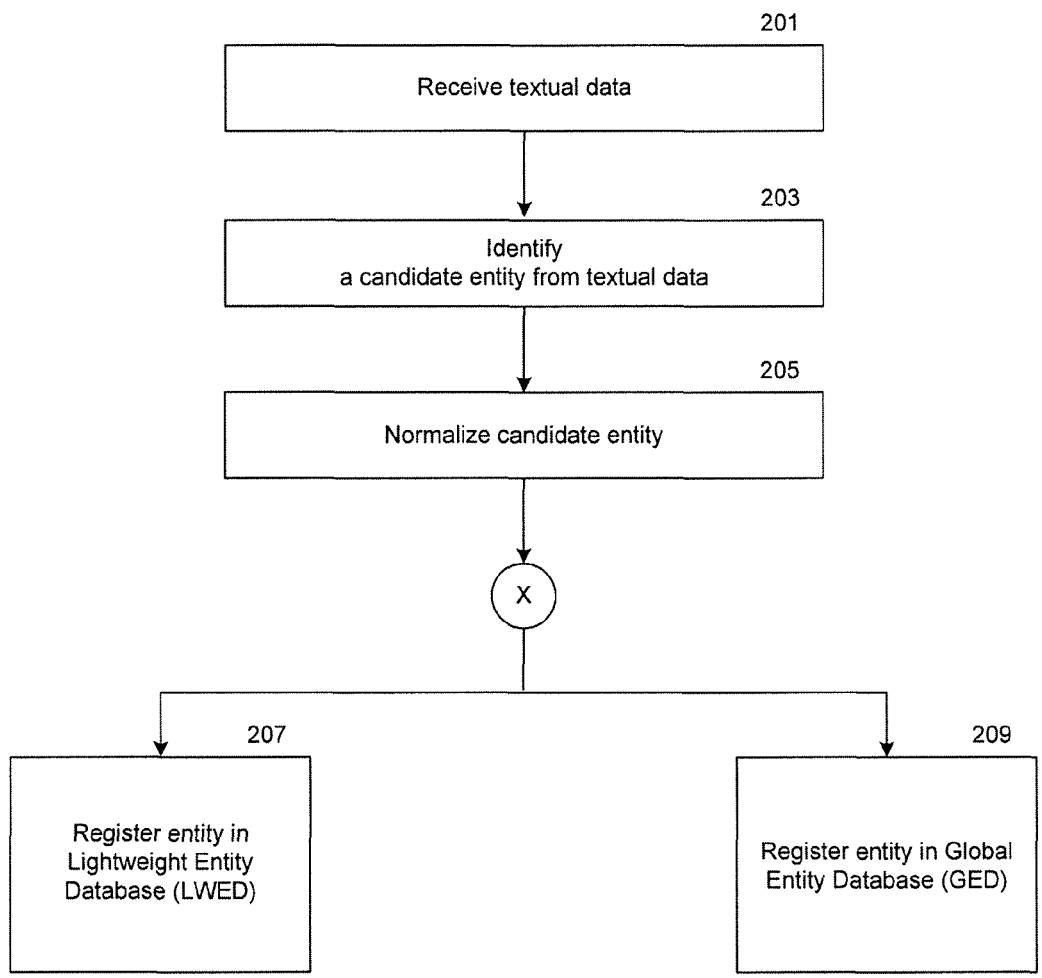
FIG. 2 is a flow diagram depicting a process for registering the entities for the digital information maintained by an organization.

FIG. 2 is a flow diagram depicting a process 200 for registering the entities for the digital information maintained by an organization. At step 201, the process 200 receives digital information (e.g., textual information, image information, etc.). At step 203, the process 200 then parses the received information to identify any potential entities (i.e., candidate entities). In one embodiment, where the received information is in the form of image data, image conversion techniques (e.g., optical character recognition, etc.) may be used to retrieve the text information from such data. The process 200 may use one of several techniques (e.g., pattern recognition, regular expression matching, etc.) to identify the entities. These techniques are described in detail with reference to FIG. 4 below.

In some instances, as indicated in step 205, the candidate entities are optionally normalized to a canonical format. This can be done by converting the candidate entities into one of several raw text formats (e.g., UTF-16 format). By doing this, the protect agent (at a later inspection stage) will be impervious to differences in character encodings, data formats, case folding, etc. in the candidate entities identified during the inspection stage.

The process 200 then proceeds to register the candidate entities within the LWED and/or the GED. At step 207, the process 200 registers the candidate entities into the LWED. Since the LWED is stored at each egress point, the overall size of the database is controlled using one or more techniques. In one embodiment, the candidate entities are converted to hash values before being registered into the LWED. One example of generating a value hash is to compute a hash based function over every character of a word and generating an integer value corresponding to that word. In another embodiment, the candidate entities are compressed by storing them in a data structure that supports membership query while introducing a small probability of false positives in the membership query. An example of such a data structure is a Bloom filter, where a large bit vector and multiple hash functions are used to determine whether a candidate entity being inspected may potentially be present in the LWED. The Bloom filter is implemented using a sequence of software instructions as indicated by an algorithm, and such software is physically stored at a physical memory location at the site of the protect agent. The implementation of the Bloom filter itself is widely known in the art and a person of ordinary skill in the art would be able to reproduce the functions of a Bloom filter to generate the LWED as indicated in this embodiment.

The process 200 also optionally includes the generation of a GED which may be stored, for example, in a remote server (e.g., 131 of FIG. 1A). At step 209, the process 200 stores the candidate entities within the GED. In some instances, the process 200 may convert the candidate entities to hash values before registering the candidate entities. The process 200 may also incorporate metadata information along with the candidate entities while registering the candidate entities. Such metadata information is valuable for auditing and self-remediation purposes. Examples of the uses of metadata information include, for example, identifying the source document associated with the candidate entity, categorizing the entities according to entity type (e.g., patient ID numbers, social security numbers, etc.), associating the entity with a particular risk level, etc.

Figure 3A:
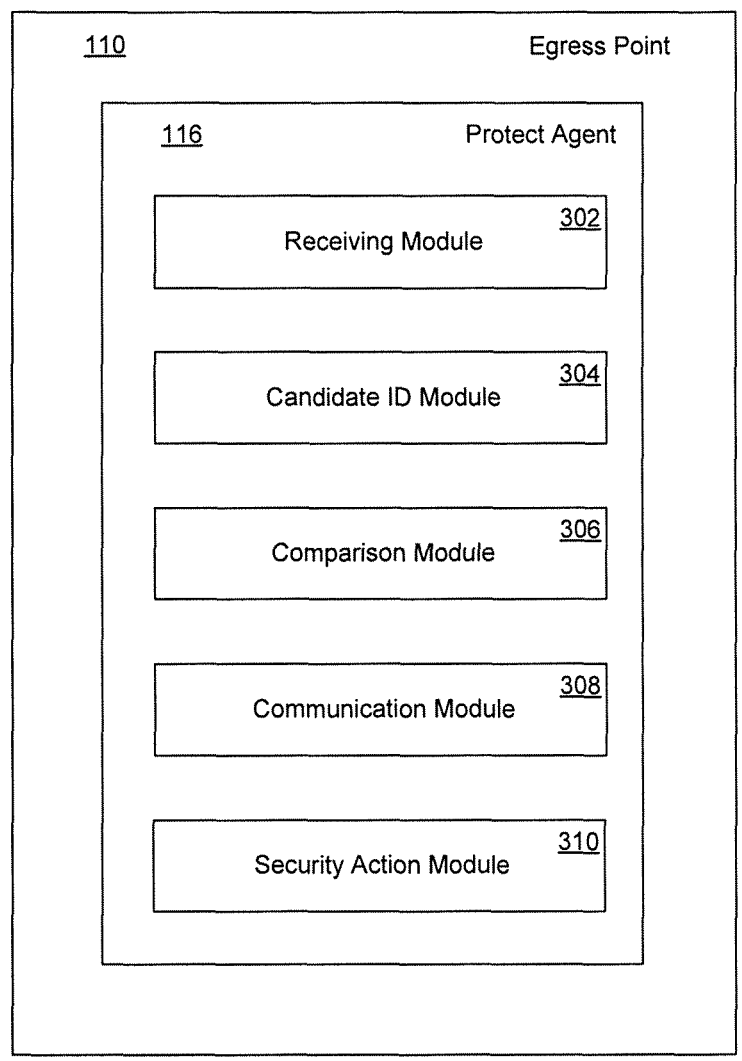
FIG. 3A is a block diagram illustrating an exemplary architecture of an egress point configured to operate a protect agent.

FIG. 3A is a block diagram illustrating an exemplary architecture of an egress point 110 configured to operate a protect agent 116 to inspect data being disclosed through the egress point 110. The protect agent 116 includes a receiving module 302, candidate ID module 304, comparison module 306, a communication module 308, and a security action module 310. As described above, the protect agent 116 can be implemented by using programmable circuitry programmed by software and/or firmware, or by using special-purpose hard-wired circuitry, or by using a combination of such embodiments. In some instances, the protect agent 116 is implemented as a unit in the processor 1201 of the egress point 110.

The receiving module 302 is configured to receive the data a user desires to disclose through the egress point 110. This data includes, for example, digital text information. The candidate ID module 304 of the protect agent 116 receives the digital information, and identifies candidate entities from the digital information. Detailed information on identifying candidate entities is provided with reference to FIG. 4 below. The candidate entities may be every word identified in the digital information, or may be words that match a particular format (as, for example, identified by a regular expression matcher). In one embodiment, the candidate ID module 304 may optionally convert the candidate entities to a canonical format, to ensure that the candidate entities are impervious to digital format, character encoding, case-folding, etc. In some embodiments, the candidate ID module 304 may also optionally convert the candidate entities to equivalent hash values (e.g., with the same hashing algorithm used during the registration of the organization's candidate entities). In some instances, the candidate ID module 304 may optionally detect and record an entity type (e.g., social security number type, patient ID type, etc.) of the candidate entity based on the format of the candidate entity The comparison module 306 receives the candidate entities from the candidate ID module 304 and compares the candidate entities with registered entities stored in an entity database. In some instances, the entity database is the LWED stored locally at the site of the egress point 110. The comparison module 206 detects the presence of candidate entities that match any of the registered entities. In some instances, the comparison module 306 directly supplies the list of matching entities to the security action module 310 for further action. In some instances, the comparison module 306 may communicate with a remote server (containing the GED) using a communication module 308 to compare the matching entities (received from the comparison against the LWED) against the registered entities stored in the GED. In this manner, the comparison module 306 can eliminate or at least reduce any false positives that may result from the comparison against the LWED. Additionally, by sending only those candidate entities identified as matching entities to the GED, the server holding the GED has to process only a limited number of candidate entities (as opposed to processing all the candidate entities identified in a textual information). This results in reduced latency time in receiving the final matching results from the GED server. Additionally, in such instances, the GED supplies the comparison module 306 with metadata information associated with the matching entities for further processing.

In some instances, the comparison module 306 may directly communicate with the remote server (i.e., the GED) in lieu of comparing the candidate entities with the LWED. In some instances, the comparison module 306 may utilize the entity type recorded by the candidate ID module 304 to compare the candidate entity only against a subset of registered entities (instead of the entire database of registered entities) that are tagged (e.g., according to their metadata information in the GED) under a similar entity type. This comparison, according to entity type of the candidate entity, further helps in reducing latency/processing time of the comparison process.

The results of the comparison are provided to the security action module 310, which proceeds to initiate an appropriate security action. In some instances, the security action module 310 utilizes metadata retrieved from, for example, the GED, to initiate various types of security actions. Examples of such security actions include preventing the information from being transmitted out through the associated egress point, sending out a security alert to a system administrator, revoking the user's access to the particular information, alerting the user of the security violation, etc. The security actions may also include integration with third party software to offer security solutions (e.g., integration with Microsoft Windows® RMS to apply rights management to the information being disclosed). It is understood that these examples of security actions are provided for illustrative purposes only, and that other security actions known to people skilled in the art are equally applicable here.

Figure 3B:
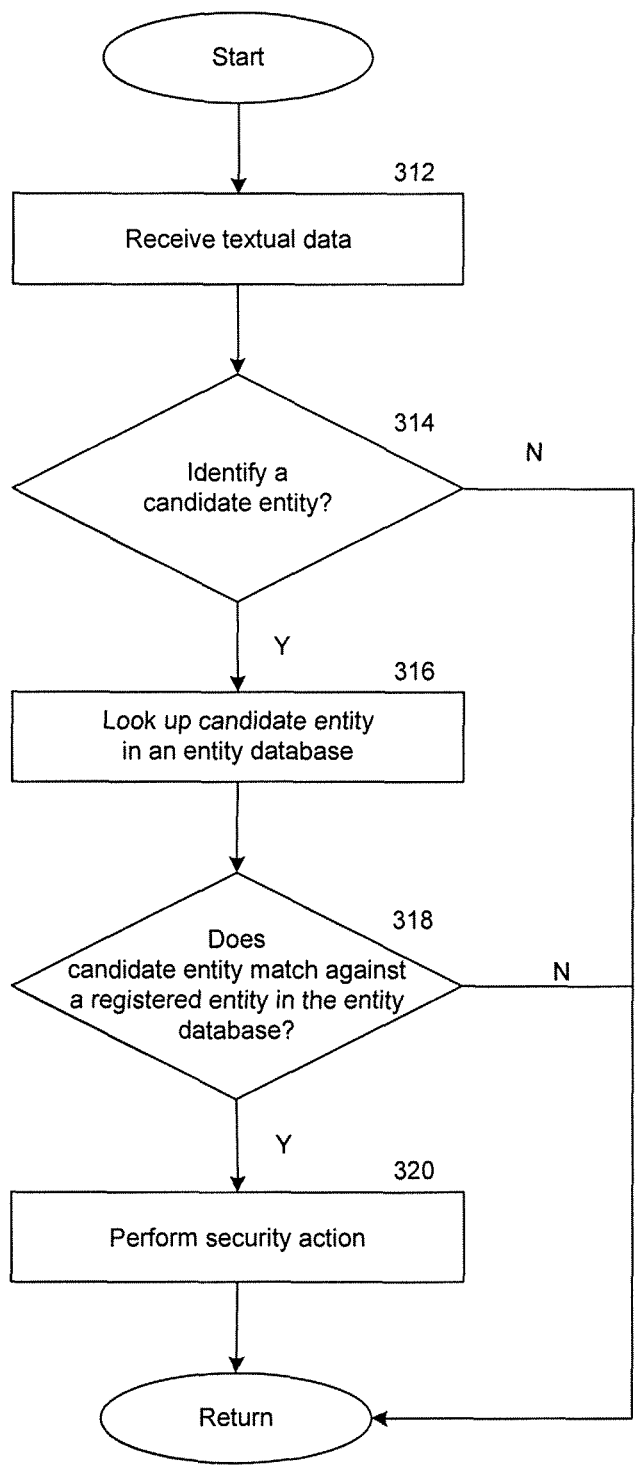
FIG. 3B is a flow diagram illustrating an exemplary inspection process performed by the protect agent

FIG. 3B is a flow diagram illustrating an exemplary inspection process 300 performed by the protect agent 116. At step 312, the process 300 receives digital information (e.g., textual data). At step 314, the process 300 identifies one or more candidate entities from the received textual information. As described above, the process 300 may optionally record the entity type of the candidate entities, and may also convert the candidate entities to a canonical format and/or hash values. If the process 300 does not identify any candidate entities at step 314, the process 300 returns and may repeat the process of receiving textual information for inspection.

At step 316, the process 300 looks up the candidate entities against registered entities in an entity database. As described above, the entity database may be an AWED and/or the GED. At 318, the process 300 determines whether the candidate entities match against one of the registered entities in the entity database. If the process 300 determines that at least one of the candidate entities matches against the registered entities, the process 300 proceeds to step 320 to perform a security action. As discussed above, the process 300 may use metadata information retrieved from the entity database to initiate appropriate security actions.

Figure 4:
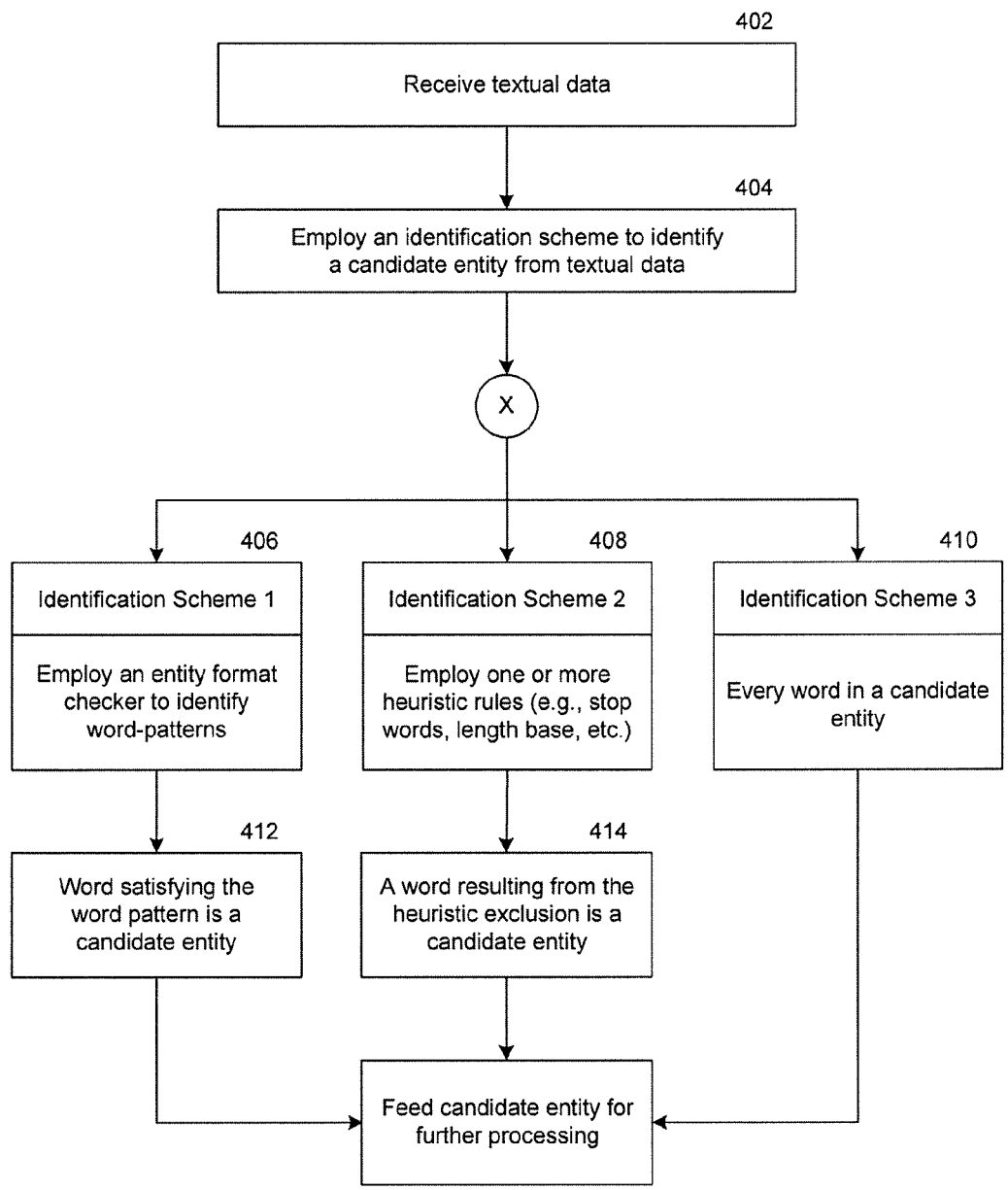
FIG. 4 is a flow diagram illustrating various mechanisms used by the registration process and the inspection process to identify a candidate entity.

FIG. 4 is a flow diagram illustrating various mechanisms used by the registration process (e.g., step 205 of FIG. 2) and the inspection process (e.g., step 314 of FIG. 3B) to identify a candidate entity. The process receives textual information at step 402, and proceeds to identify candidate entities at step 404. As illustrated in FIG. 4, the candidate entity may be chosen according to one or more of the following identification schemes. Step 406 represents identification scheme 1, where the process employs an entity format checker to identify word-patterns or word-formats. For example, a regular expression matcher may be used to identify regular expressions (e.g., a social security number expression structured according to a particular pattern) in the received textual information. Accordingly, at step 412, the process records any entity in the textual data that satisfies the particular word-pattern or word-format targeted by the entity format checker.

Step 408 represents identification scheme 2, where the process employs one or more heuristic rules to exclude or skip over non-entity words. In a first example, the heuristic rule may define stop words that can be skipped over. Examples of stop words include words that commonly occur in the language (e.g., prepositions, etc.), common words considered non-confidential by the organization (e.g., address information, disclaimer language included by default in patient admittance forms, etc.). In a second example, the heuristic rule may require any words shorter than the shortest word in the entity database (or longer than the longest word in the entity database) to be excluded from consideration as a candidate entity. Other similar heuristic rules, as appreciated by a person of ordinary skill in the art, can also be employed in implementing the identification scheme 2 described herein. As indicated in step 414, the words that are not excluded by the heuristic rule are submitted as candidate entities.

Step 410 represents identification scheme 3, where every word (e.g., every set of characters demarcated by one or more spaces) in the received textual information is treated as a candidate entity. It is understood that a person of ordinary skill in the art may combine one or more of these identification schemes, or add other identification schemes that are readily apparent to such a person, to improve the efficiency of the candidate entity identification process.

Figure 5:
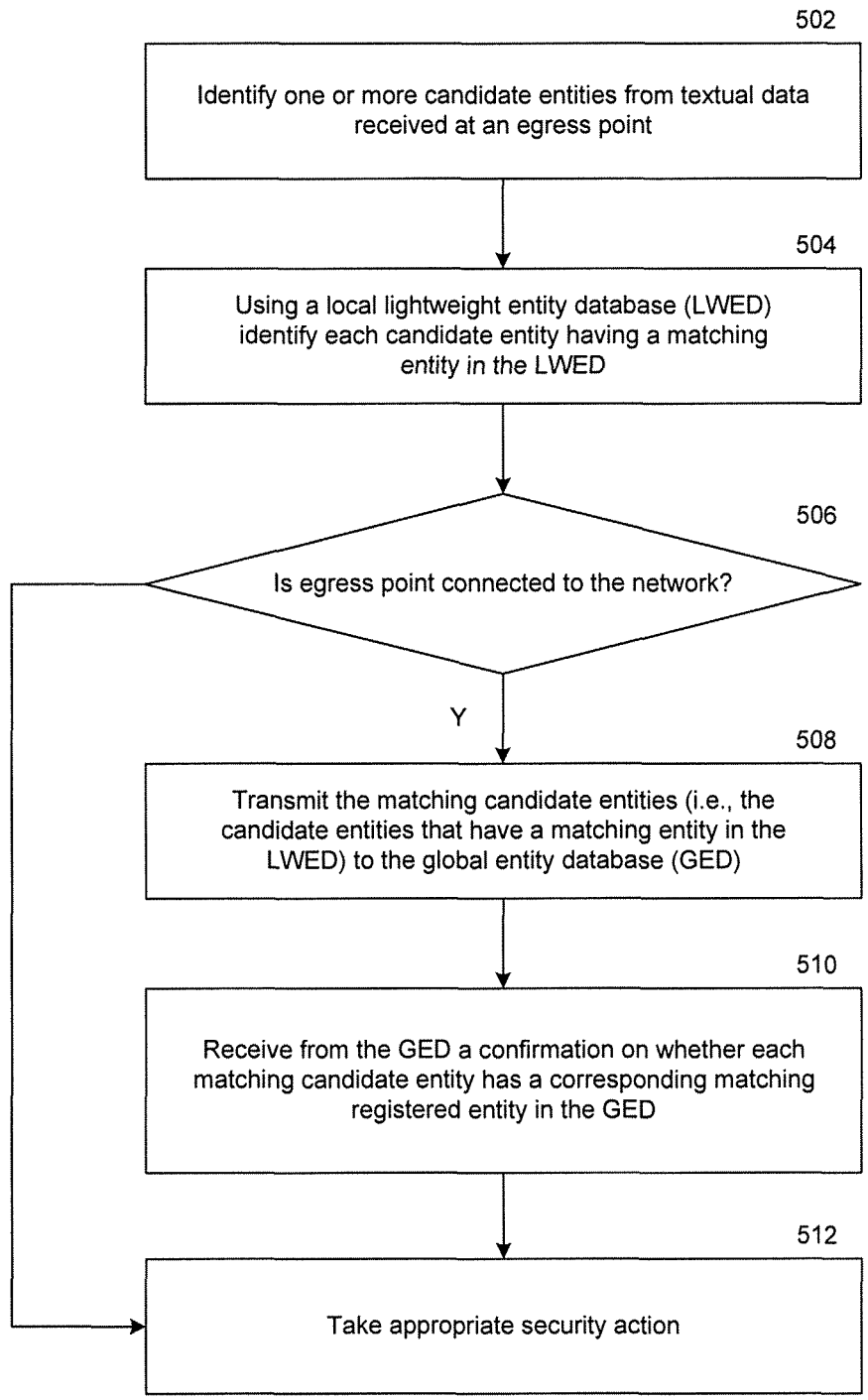
FIG. 5 is a flow diagram depicting an exemplary process 500 for comparison of the received candidate entities.

FIG. 5 is a flow diagram depicting an exemplary process 500 for comparison of the received candidate entities. At step 500, the process identifies the candidate entities that need to be compared against the registered entities in the entity database. At step 504, the process 500 matches the candidate entities against registered entities in an LWED located at the site of the egress point. Using this lookup, the process 500 generates a list of candidate entities that match against any of the registered entities. In some instances, the process 500 directly communicates this information to a security action module to initiate appropriate security action. In other instances, as indicated in step 506, the process 500 determines whether the egress point is connected to the network. If the egress point is not connected to the network, the process 500 proceeds to step 512, where the process 500 initiates an appropriate security action.

If the egress point is connected to the network, then the process 500 transmits the matching candidate entities to the remote server holding the GED. The GED server compares the received candidate entities against the registered entities in the GED. This allows the process 500 to eliminate or reduce the number of false positives that may have been identified by the comparison against LWED. Additionally, by sending only those candidate entities identified as matching entities to the GED, the GED server has to process only a limited number of candidate entities (as opposed to processing all the candidate entities identified in a textual information). This results in reduced latency time in receiving the final matching results from the GED server. Additionally, the GED server may also return metadata information associated with the matching candidate entities. The process 500 then proceeds to step 512 to initiate one or more security actions.

It is emphasized, however, that in some embodiments, the process 500 may operate by matching the candidate entities exclusively against the LWED (i.e., by initiating the security action subsequent to comparison of the candidate entities against the registered entities in the LWED). In other embodiments, the process 500 may operate by matching the candidate entities exclusively against the GED (i.e., by directly comparing the candidate entities against the GED instead of the LWED).

The techniques introduced above can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method for preventing unauthorized disclosure of secure information, the method comprising:
   receiving, by a protect agent installed at a first egress point, digital information including a first text, the first text including a plurality of words;
   identifying, by the protect agent, a first candidate entity, the first candidate entity corresponding to a particular word of the plurality of words;
   comparing, by the protect agent, the first candidate entity against a plurality of compressed registered entities stored in a lightweight entity database (LWED) stored locally to the protect agent;
   upon determining, by the protect agent, that the first candidate entity matches against a first registered entity in the LWED, transmitting the first candidate entity to a remote server that can access a global entity database (GED), wherein the GED includes the plurality of registered entities in an uncompressed form, and wherein the remote server automatically generates a confirmation on whether the first candidate entity matches against a second registered entity in the GED;
   receiving from the remote server, by the protect agent, the confirmation; and
   performing, by the protect agent, a security action when the first candidate entity matches against a particular registered entity of the registered entities in the GED, wherein the security action is performed on the first text before the first text is disclosed through the first egress point.

2. The method of claim 1, wherein the identification of the first candidate entity from the plurality of words further comprises:
   utilizing an entity format matcher to identify a first word from the plurality of words that matches a particular word-pattern.

3. The method of claim 1, wherein the identification of the first candidate entity from the plurality of words further comprises:
   utilizing a heuristics engine to skip over one or more words from the plurality of words based on a heuristic rule.

4. The method of claim 3, wherein the heuristic rule includes one or more of:
   skipping over a first word from the plurality of words when the first word matches a first stop word of a plurality of stop words;
   skipping over a second word from the plurality of words when the second word has a word-length that is shorter than a first word-length of a shortest registered entity of the plurality of compressed registered entities; or
   skipping over a third word from the plurality of words when the third word has a word-length that is longer than a second word-length of a longest registered entity of the plurality of registered entities.

5. The method of claim 1, wherein the identification of the first candidate entity from the plurality of words further comprises identifying a first entity type associated with the candidate entity.

6. The method of claim 5, wherein with the plurality of compressed registered entities stored in the the LWED are categorized according an entity type associated with each of with the plurality of compressed registered entities.

7. The method of claim 6, wherein the comparison of the first candidate entity against the plurality of compressed registered entities further comprises:
   identifying a subplurality of registered entities that are categorized based on the first entity type;
   comparing the first candidate entity against the subplurality of registered entities that are categorized based on the first entity type.

8. The method of claim 1, wherein the first candidate entity is converted to a canonical format prior to being compared against the plurality of compressed registered entities, wherein the canonical format causes the protect agent to be impervious to differences in digital format and character encoding of the first candidate entity.

9. The method of claim 1, wherein the registered entities stored in the GED correspond to entity words that are desired to be secured from unauthorized distribution.

10. The method of claim 9, wherein the LWED is generated by:
    generating hash-values for each registered entity of the plurality of registered entities; and
    storing the generated hash-values in a probabilistic data structure.

11. The method of claim 10, wherein the probabilistic data structure is a Bloom filter.

12. The method of claim 1, wherein the GED is stored in association with a remote server, and wherein the protect agent at the first egress point communicates with the GED utilizing a network.

13. The method of claim 12, wherein each of the plurality of uncompressed registered entities in the GED is represented using a corresponding hash-value.

14. The method of claim 1, wherein each of the the registered entities in the GED includes metadata information, the metadata information for a given registered entity including one or more of:
   an entity type associated with the given registered entity;
   a location of the given registered entity within a particular document; or
   an origin information of a particular document.

15. The method of claim 1, wherein the security action includes one or more of:
   preventing the first text from being disclosed through the first egress point;
   logging transmission of the first text as a security violation;
   requiring a password from a user to allow the first text to be disclosed;
   blocking access by a user who transmitted the first text to the first text;
   sending out a security alert; or
   integration of the first text with rights management information.

16. A method for preventing unauthorized disclosure of secure information, the method comprising:
   receiving, by a protect agent installed at a first egress point, digital information including a first text, the first text including a plurality of words;
   identifying, by the protect agent, a plurality of candidate entities, each of the plurality of candidate entities corresponding to a particular word of the plurality of words;
   identifying, by the protect agent, one or more matching candidate entities from the plurality of candidate entities that match against one of a plurality of lightweight entities stored in a lightweight entity database (LWED);
   upon determining one or more matching candidate entities, transmitting, by the protect agent, the one or more matching candidate entities to a remote server that can access a global entity database (GED), the GED including a plurality of registered entities identified to be secured against unauthorized disclosure, wherein the remote server performs a comparison of the one or more matching candidates entities with the plurality of registered entities in the GED to reduce a possibility that the identified one or more matching candidate entities are false positives, and wherein the remote server automatically generates acknowledgement whether each of the one or more matching candidate entities matches against one of the plurality of registered entities included in the GED;
   receiving, from the remote server, the acknowledgement; and
   performing, by the protect agent, a security action, when at least one of the one or more matching entities matches against one of the plurality of registered entities included in the GED, wherein the security action is performed on the first text before the first text is disclosed through the first egress point.

17. The method of claim 16, wherein each of the plurality of registered entities included in the GED is generated by:
   generating a hash-value for a first entity that an organization protects from unauthorized disclosure; and
   associating the hash-value with metadata related to the first entity.

18. The method of claim 17, wherein the metadata related to the first entity includes one or more of:
   an entity type associated with the first entity;
   a location of the first entity within a particular document; or
   an origin information of a particular document.

19. The method of claim 17, wherein the LWED is a compressed version of the GED.

20. The method of claim 19, wherein the compressed version is generated by:
   stripping metadata information associated with each of the hash-values corresponding to the plurality of registered entities in the GED; and
   storing the stripped hash-values in a probabilistic data structure.

21. The method of claim 20, wherein the probabilistic data structure is a Bloom filter.

22. The method of claim 16, wherein the identification of a particular candidate entity from the plurality of words further comprises:
   utilizing an entity format matcher to identify a first word from the plurality of words that matches a particular word-pattern.

23. The method of claim 16, wherein the security action includes one or more of:
   preventing the first text from being disclosed through the first egress point;
   logging transmission of the first text as a security violation;
   requiring a password from a user to allow the first text to be disclosed;
   blocking access by a user who transmitted the first text to the first text;
   sending out a security alert; or
   integration of the first text with rights management information.

24. A system for preventing unauthorized disclosure of secure information, the system having a processor and comprising:
   a receiving module to receive digital information including a first text, the first text including a plurality of words;
   a candidate ID module to identify a first candidate entity, the first candidate entity corresponding to a particular word of the plurality of words;
   a comparison module to compare the first candidate entity against a plurality of compressed registered entities stored in a lightweight entity database (LWED) stored locally;
   a communication module to transmit the first candidate entity to a remote server that can access a global entity database (GED), wherein the GED includes the plurality of registered entities in an uncompressed form, and wherein the remote server automatically generates a confirmation on whether the first candidate entity matches against a second registered entity in the GED;
   the communication module to receive from the remote server the confirmation; and
   a security action module to perform a security action when the first candidate entity matches against a particular registered entity of the registered entities in the GED, wherein the security action is performed on the first text before the first text is disclosed through the system.

25. The system of claim 24, wherein the candidate ID module includes:
   an entity format matcher to identify a first word from the plurality of words that matches a particular word-pattern.

26. The system of claim 24, wherein the candidate ID module includes:
a heuristics engine to skip over one or more words from the plurality of words based on a heuristic rule.

27. The system of claim 26, wherein the heuristic rule includes one or more of:
skipping over a first word from the plurality of words when the first word matches a first stop word of a plurality of stop words;
skipping over a second word from the plurality of words when the second word has a word-length that is shorter than a first word-length of a shortest registered entity of the plurality of compressed registered entities; or
skipping over a third word from the plurality of words when the third word has a word-length that is longer than a second word-length of a longest compressed registered entity of the plurality of registered entities.

28. The system of claim 24, wherein the identification of the first candidate entity from the plurality of words by the candidate ID module further comprises identifying a first entity type associated with the candidate entity.

29. The system of claim 28, wherein the plurality of compressed registered entities stored in the LWED are categorized according an entity type associated with each of the plurality of compressed registered entities.

30. The system of claim 29, wherein the comparison of the first candidate entity against the plurality of compressed registered entities by the comparison module further comprises:
identifying a subplurality of registered entities that are categorized based on the first entity type;
comparing the first candidate entity against the subplurality of registered entities that are categorized based on the first entity type.

31. The system of claim 24, wherein the first candidate entity is converted to a canonical format prior to being compared against the plurality of compressed registered entities, wherein the canonical format causes the comparison module to be impervious to differences in digital format and character encoding of the first candidate entity.

32. The system of claim 24, wherein the registered entities stored in the GED correspond to entity words that are desired to be secured from unauthorized distribution.

33. The system of claim 24, wherein the compressed registered entities stored in the LWED are is generated by:
generating hash-values for each registered entity of the plurality of registered entities in the GED; and
storing the generated hash-values in a probabilistic data structure.

34. The system of claim 33, wherein the probabilistic data structure is a Bloom filter.

35. The system of claim 24, wherein the GED is stored in association with a remote server, and wherein the communication module communicates with the GED utilizing a network.

36. The system of claim 35, wherein each of the registered entities in the GED is represented using a corresponding hash-value.

37. The system of claim 36, wherein each of the registered entities in the GED includes metadata information, the metadata information for a given registered entity including one or more of:
an entity type associated with the given registered entity;
a location of the given registered entity within a particular document; or
an origin information of a particular document.

38. The system of claim 24, wherein the security action performed by the security module includes one or more of:
preventing the first text from being disclosed through the system;
logging transmission of the first text as a security violation;
requiring a password from a user to allow the first text to be disclosed;
blocking access by a user who transmitted the first text to the first text;
sending out a security alert; or
integration of the first text with rights management information.

39. A system for preventing unauthorized disclosure of secure information, the system comprising:
a processor;
a network interface through which to communicate with one or more remote servers over a network;
a memory storing code which, when executed by the processor, causes the processor to perform a plurality of operations, including:
receiving, by a protect agent installed at a first egress point, digital information including a first text, the first text including a plurality of words;
identifying, by the protect agent, a plurality of candidate entities, each of the plurality of candidate entities corresponding to a particular word of the plurality of words;
identifying, by the protect agent, one or more matching candidate entities from the plurality of candidate entities that match against one of a plurality of lightweight entities stored in a lightweight entity database (LWED);
upon determining one or more matching candidate entities, transmitting, by the protect agent, the one or more matching candidate entities to a remote server that can access a global entity database (GED), the GED including a plurality of registered entities identified to be secured against unauthorized disclosure, wherein the remote server performs a comparison of the one or more matching candidates entities with the plurality of registered entities in the GED to reduce a possibility that the identified one or more matching candidate entities are false positives, and wherein the remote server automatically generates acknowledgement whether each of the one or more matching candidate entities matches against one of the plurality of registered entities included in the GED;
receiving, from the remote server, the acknowledgement; and
performing, by the protect agent, a security action, when at least one of the one or more matching entities matches against one or the plurality of registered entities included in the GED, wherein the security action is performed on the first text before the first text is disclosed through the first egress point.

40. The system of claim 39, wherein each of the plurality of registered entities included in the GED is generated by:
generating a hash-value for a first entity that an organization protects to protect from unauthorized disclosure; and
associating the hash-value with metadata related to the first entity.

41. The system of claim 40, wherein the metadata related to the first entity includes one or more of:
an entity type associated with the first entity;
a location of the first entity within a particular document; or
an origin information of a particular document.

42. The system of claim 40, wherein the LWED is a compressed version of the GED.

43. The system of claim 42, wherein the compressed version is generated by:
- stripping metadata information associated with each of the hash-values corresponding to the plurality of registered entities in the GED; and
- storing the stripped hash-values in a probabilistic data structure.

44. The system of claim 43, wherein the probabilistic data structure is a Bloom filter.

45. The system of claim 39, wherein the identification of a particular candidate entity from the plurality of words further comprises:
- utilizing an entity format matcher to identify a first word from the plurality of words that matches a particular word-pattern.

46. The system of claim 39, wherein the security action includes one or more of:
- preventing the first text from being disclosed through the first egress point;
- logging transmission of the first text as a security violation;
- requiring a password from a user to allow the first text to be disclosed;
- blocking access by a user who transmitted the first text to the first text;
- sending out a security alert; or
- integration of the first text with rights management information.

* * * * *